INVENTOR.
Robert T. Avery
BY
ATTORNEY

INVENTOR.
Robert T. Avery
BY
Wm J Nolan
ATTORNEY

United States Patent Office 3,360,647
Patented Dec. 26, 1967

3,360,647
ELECTRON ACCELERATOR WITH SPECIFIC DEFLECTING MAGNET STRUCTURE AND X-RAY TARGET
Robert T. Avery, Orinda, Calif., assignor to Varian Associates, Palo Alto, Calif., a corporation of California
Continuation of application Ser. No. 46,432, Aug. 1, 1960. This application Sept. 14, 1964, Ser. No. 411,170
8 Claims. (Cl. 250—49.5)

This application is a continuation application of U.S. patent application Ser. No. 46,432 by Robert T. Avery filed Aug. 1, 1960, now abandoned, and assigned to the same assignee as the present application.

The present invention relates in general to particle accelerators and in particular to methods and means for irradiating objects with ionizing radiation for research, therapy, sterilization, polymerization, radiography and the like.

In the field of ionizing radiation, particle acceleration machines of large size such as Van de Graaff generators, resonant transformers and linear accelerators are used for producing very energetic radiation. In using these machines it is often desirable to direct the high energy particles or the rays produced by high energy particles from many different directions at the object being irradiated. The conventional approach in designing high energy irradiation machines is to have the particle beam strike the object or irradiation target in the forward direction. The machines just referred to are very long and are not easily moved about and therefore, they require a large mounting fork or gantry. In this manner, these machines require considerable head room for overhead "shots" and require a large room to accommodate the rear of the machine for distant horizontal "shots." Furthermore, this construction does not readily permit lateral internal "shots" of large hollow structures.

Also the particle beam emanating from the particle accelerating machines contains particles of different energies many of which it is desired to direct in the same direction or focus on a small spot. Furthermore in certain irradiation machines, such as for use in therapy, a change in energy of the particle beam emanating from the machine over a period of time must not effect the ultimate direction on the ionizing radiation or serious harm might come to the patient.

The present invention relates to accelerating a particle beam along a substantially horizontal axis and directing the beam at an angle of 90° with respect to its original axis to irradiate an object from many directions. With this scheme in mind other criterion govern the manner in which this can be accomplished since invariably a wide range of particle energies (momentum) emanate from the particle accelerator. In an industrial radiographic irradiation machine, for example, it is important that the particle spot size on the X-ray target be as small as possible in order to achieve a sharp X-ray image. On the other hand in an irradiation machine which produces X-rays for therapy it is more important that the X-ray beam be uniform over the area being irradiated since small changes in the energy of the particles striking the X-ray target are apt to cause a dangerous overdose in a portion of the area being irradiated.

The object of the present invention is to provide a novel method and means for irradiating objects with large particle accelerating machines from many different directions within a relatively limited space.

One feature of the present invention is the provision of a novel irradiation machine including a horizontal particle accelerating means, means for deflecting the particle beam emanating from the particle accelerator means at an angle of 90° with respect to its original direction, and means for moving the accelerator in both horizontal and vertical directions for irradiating an object from many sides.

Another feature of the present invention is the provision of an irradiation machine of the first mentioned feature including means for rotating the deflecting means about the axis of the accelerator means whereby ionizing radiation may be directed on the interior surface of a cylindrical object.

Another feature of the present invention is a provision of an irradiation machine of the first mentioned feature including means for rotatably supporting the accelerator means about a horizontal axis spaced from the axis of the accelerating means.

Another feature of the present invention is the provision of a novel irradiation machine of the last mentioned feature including means for positioning the portion of the object being irradiated on the horizontal axis of the supporting means and rotating the portion of the object being irradiated about a vertical axis through the portion of the object being irradiated.

Another feature of the present invention is the provision of an irradiation machine of the first mentioned feature wherein the deflecting means includes first magnet means adapted to deflect the accelerated particle beam a small angle from its axis and second magnet means adapted to deflect the beam so that it crosses the axis of the particle accelerator substantially perpendicular thereto.

Still another feature of the present invention is the provision of an irradiation machine of the first mentioned feature wherein the deflecting means includes magnet means adapted to deflect the beam through substantially 270° whereby the particle beam crosses the axis of the particle accelerator means substantially perpendicular thereto.

Still another feature of the present invention is the provision of an irradiation machine of the first mentioned feature wherein the deflecting means include first magnet means for deflecting the particle beam a small angle from its original direction, second magnet means for deflecting the particle beam the remainder of the 90° and a target for producing ionization irradiation positioned in the second deflecting magnet means out of the path of the particle beam deflected by said first magnet means but positioned such that the particle beam entering said second deflecting magnet means along the axis of said particle accelerator means will be deflected through substantially 90° and strike said target.

Still another feature of the present invention is the provision of a novel method for irradiating objects with ionizing irradiation including the steps of accelerating a particle beam along a horizontal axis, deflecting the accelerated particle beam substantially 90° with respect to the accelerator axis and providing horizontal and vertical motion for the accelerating means and rotational motion about a vertical and horizontal axis whereby an object can be irradiated from many directions within a relatively small area.

The particular irradiation machines depicted in the drawing and described in the following specification are especially designed for directing a beam of electrons at a target or object to be irradiated. However, the features of the present invention are equally applicable to irradiating machines for irradiating objects with other particles such as, for example, protons, deuterons and neutrons. Also, the novel irradiating machines are adaptable for use with both pulsed and continuous beams.

Referring to FIGS. 1–5 of the drawings, an irradiating head 21 is rotatably mounted on the end of a particle accelerating device 22 such as, for example, a linear accelerator. This particle accelerator could be a Van de Graaff generator or a resonant transformer accelerator. The particle accelerator 22 is mounted horizontally with its cooperating electronic components housed in a cabinet 23 on the end of a vertically rotatable telescoping boom 24 the upper end of which is supported from an overhead crane 25 which can be moved the length and width of the room in which the particle accelerator 22 is housed.

Figures 3, 4, 9:
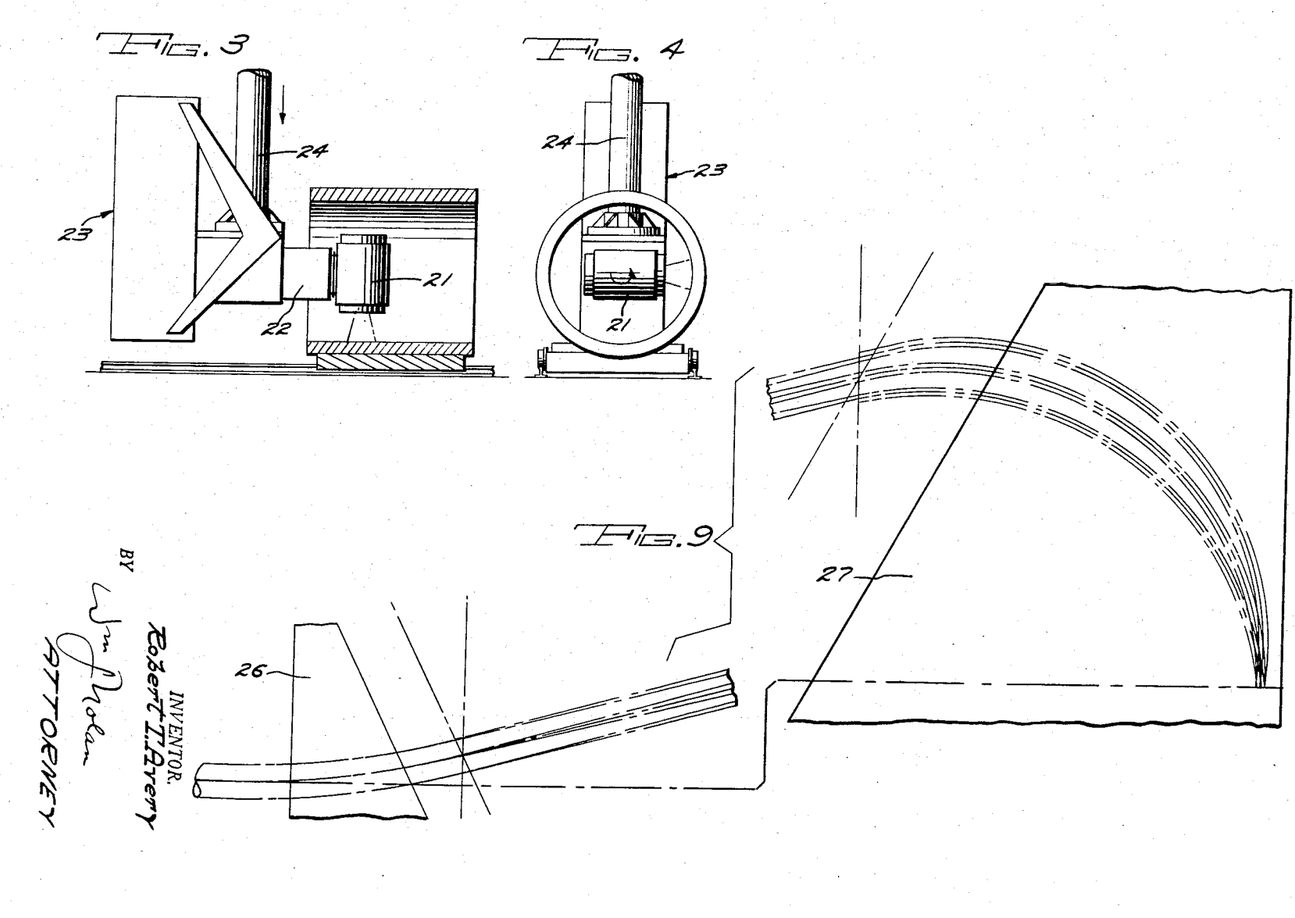
FIGS. 3 and 4 are additional views of the radiographic irradiation machine of FIGS. 1 and 2 with the machine positioned so as to direct X-rays at different portions of a cylindrical member from within the cylinder.
FIG. 9 is a schematic view showing one manner in which the particle beam can be deflected through a 90° angle from the original direction and focused on a small spot.

With the irradiating head 21 rotatably mounted on the end of the horizontally positioned particle accelerator 22 an irradiating beam can be directed substantially anywhere within the room housing the particle accelerator 22. Thus, when using the irradiating head 21 to generate an X-ray beam for use in industrial radiography the X-ray source can be located closer to the floor, ceiling, or any walls with this configuration. Furthermore, the irradiating head 21 can be positioned within a cylinder as shown in FIGS. 3 and 4 and internal radiography achieved by rotating the irradiating head 21 about the horizontal axis of the particle accelerator 22.

Figures 1, 5:
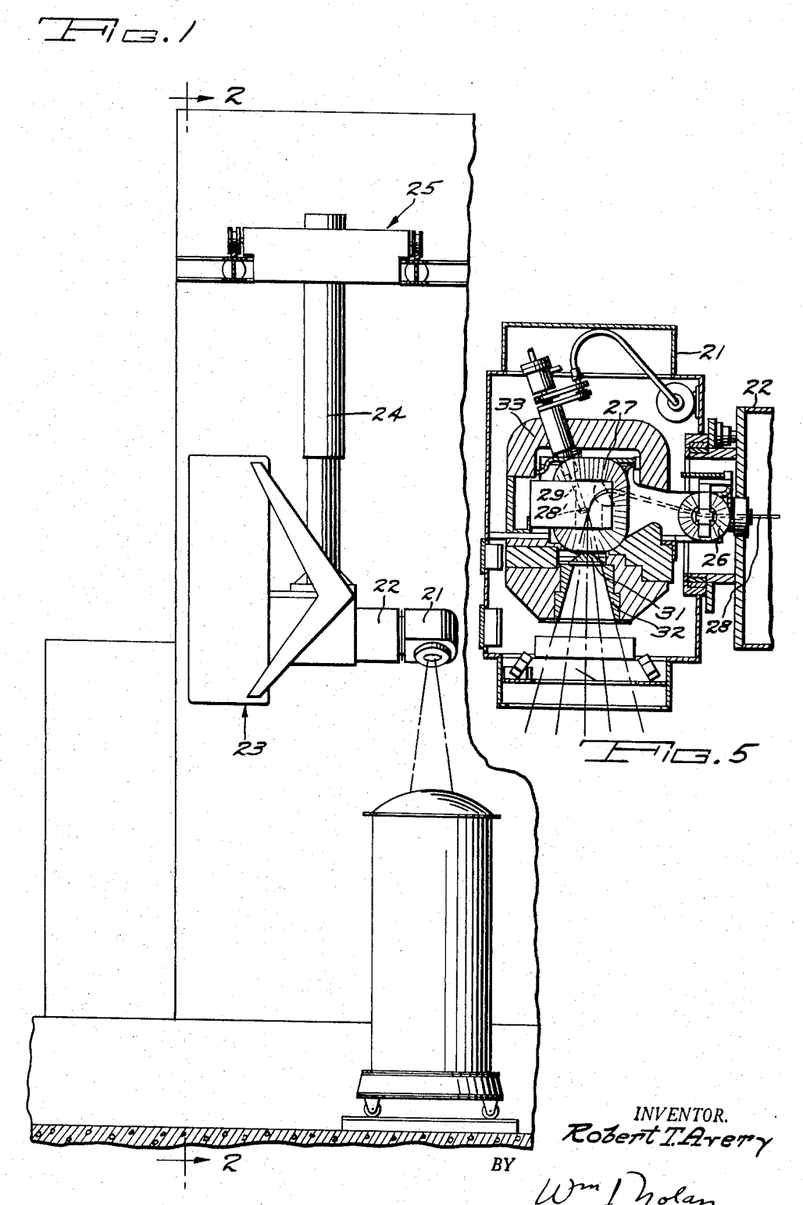
FIG. 1 is a diagrammatic view of a radiographic irradiation machine embodying features of the present invention.
FIG. 5 is a side view partially broken away of the irradiation head on the radiographic irradiation machine as shown in FIGS. 1–4.
Figure 2:
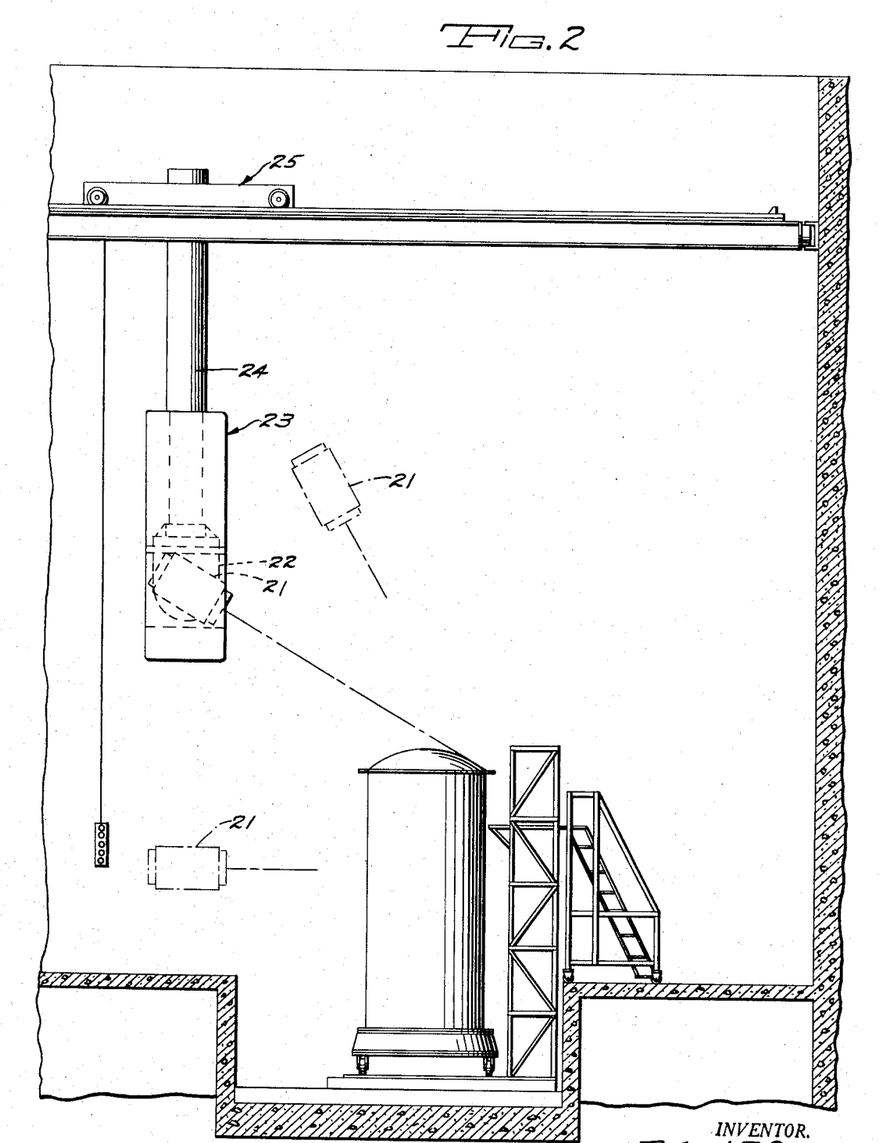
FIG. 2 is a diagrammatic view of the structure shown in FIG. 1 taken along line 2—2 in the direction of the arrows.

Referring now to FIG. 5 a typical irradiation head 21 for use in industrial radiographic applications would include first and second bending magnets 26 and 27 respectively for first deflecting an electron beam 28 emanating from the particle accelerator 22 through a small angle and then bending the particle beam back toward the accelerator axis so that when it crosses the axis it is substantially perpendicular thereto. The manner in which this particular scheme for bending the particle beam focuses the beam into a small spot even when the beam includes particles of different energies will be described in detail below with reference to FIG. 9. At the position at which the bent particle beam crosses the axis of the accelerator an X-ray target 28' is positioned such as by means of a motor driven rotating rod 29 whereby the X-ray target 28' can be rotated to aid in long life. The X-rays emanating from the X-ray target 28' will pass through a beam flattener 31 as of, for example, aluminum which provides a greater thickness of the center portion of the beam of X-rays to provide a uniform intensity across the X-ray beam. The size of the X-ray beam is limited by a collimator 32 such as lead and the remainder of the area around the second bending magnet and the X-ray target 28' is surrounded by lead shielding 33 for preventing excessive irradiation in directions other than through the collimator 32.

Figures 6, 7, 8:
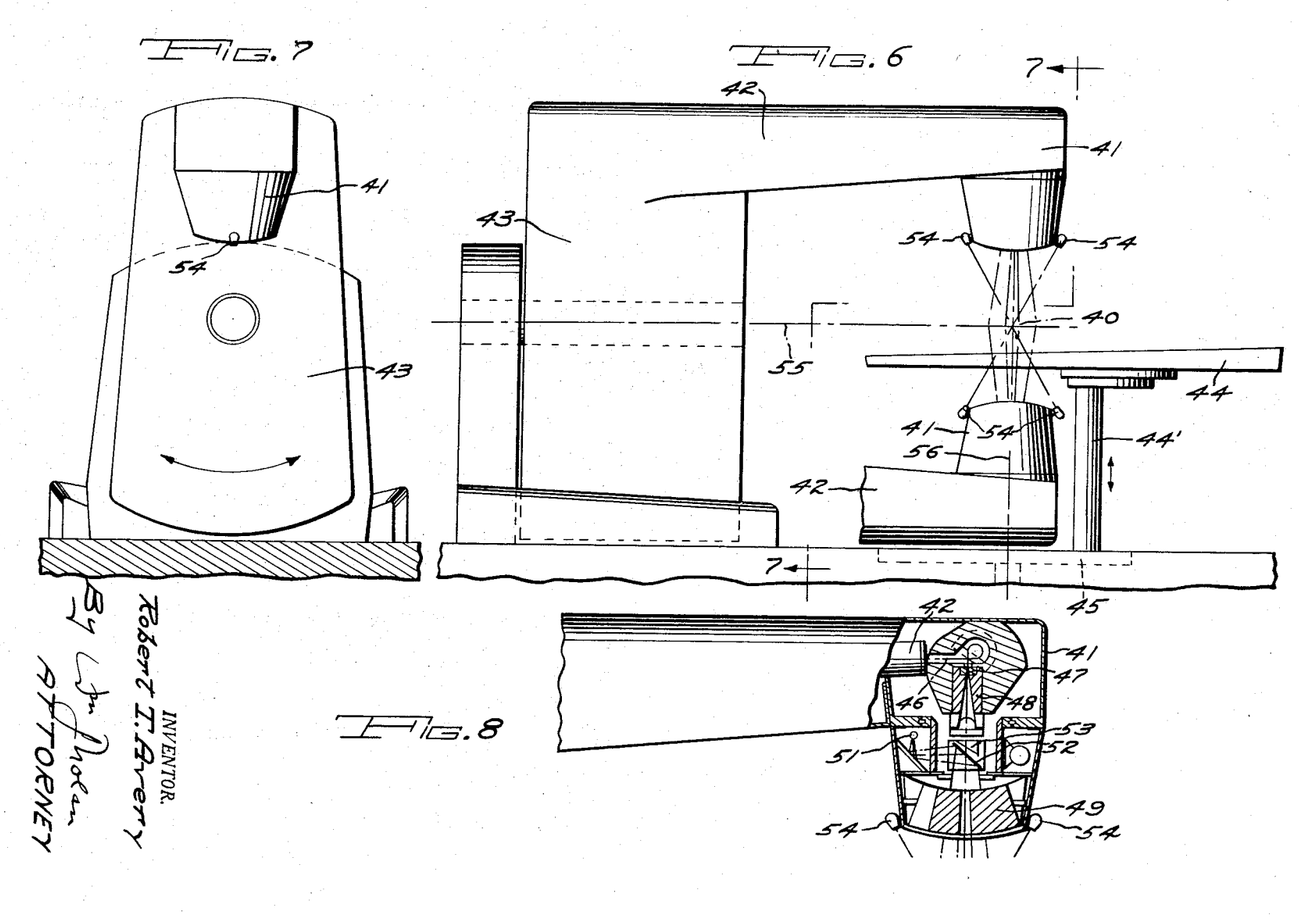
FIG. 6 is a side perspective view of an irradiation machine embodying features of the present invention and useful for therapy.
FIG. 7 is an end view of the structure of FIG. 6 taken along the line 7—7 in the direction of the arrows.
FIG. 8 is a side view partially broken away of a possible particle beam bending apparatus as utilized in the head of the irradiation machine shown in FIGS. 6 and 7.

Referring now to FIGS. 6–8, there is shown apparatus for adaption of the present invention for use in therapy. An irradiation head 41 is mounted at the end of a substantially horizontal particle accelerator 42 which is supported on a counter-weighted gantry 43 rotatable about a horizontal axis 55 which passes through the spot 40 where the portion of the patient which is being irradiated is positioned. The X-ray beam will always be directed perpendicularly on the same spot 40 on the axis of the gantry, and the gantry can make a complete rotation about spot 40 within a room and require very little headroom. A typical machine fits within a room 8 feet high.

The patient is placed on a couch 44 with the malignancy to be irradiated positioned at the spot 40 on the gantry axis 55. The couch is supported by a vertically movable post 44' placed a distance away from a vertical axis 56 passing through the spot 40 so that the irradiation head 41 can pass beneath the spot 40. The post 44' is supported on a floor level horizontal platform 45 which is rotatable about the vertical axis 56 passing through through the spot 40. In this manner the gantry can rotate through 360° in a vertical plane which passes through the spot 40 and the patient can be moved through almost 360° in a horizontal plane so that the malignancy can be irradiated from almost every direction. It is obvious that a chair could be used in place of the couch 44.

The irradiating head 41 includes magnet means such as that shown in FIGS. 10–13 and described in more detail below whereby the electron beam 46 emanating from the particle accelerator 42 is bent through substantially 270° and directed vertically downward onto an X-ray target 47. The amount of X-rays emanating from the X-ray target 47 is limited to a small spherical angle by a collimator 48 and then further limited to the desired spot size by two pairs of movable shielding jaws 49. Also, a light 51 can be directed on the area being irradiated by reflecting it off a mirror 52 which lies in the path of the X-ray beam. Thus the light 51 will follow the path of the beam. A wedge filter 53 can be positioned in the path of the X-ray beam when the patient is lying on his side so that the X-ray intensity across a malignancy is relatively uniform even though some X-rays have passed through a greater distance of body tissue.

Referring now to FIG. 9, there is shown the manner in which the particle beam emanating from a particle accelerator with an energy spread of, for example, 10% is deflected a small angle away from the axis of the particle accelerator upon passing between the pole pieces of a first deflecting magnet 26 and is then bent back toward the axis of the particle accelerator upon passing between the pole pieces of a second magnet 27. In this manner the beam is focused such that it crosses the axis of the accelerator at right angles thereto and focuses into a small spot thereon. The deflection caused by the first deflecting magnet 26 causes rays of varying energies to diverge and causes rays of the same energy to converge horizontally. The second bending magnet 27 bends the beam in the reverse direction and causes rays of different energies in an original horizontal position to focus down to a small spot.

The location of the "energy focus" is primarily determined by the entrance angle of the second bending magnet 27. The location of the "horizontal" focus can be shifted by varying the entrance or exit angles or the radius of curvature of the first bending magnet 26. By suitable adjustment of these perimeters these two foci can be made coincident. The location of the "vertical" focus can be changed by varying the gap-radius ratio of the second magnet which changes the amount of bending in the magnet fringe field. By suitably shifting the vertical focus, it can be made coincident with the other two foci which produce a very small focal spot size. Industrial radiographic applications require an extremely small electron beam spot size on the X-ray target to create a "point source" in order to produce a sharp image on the X-ray films surrounding the particle being X-rayed. By utilizing the first and second bending magnets 26 and 27 it is possible to focus a 10 m.e.v. electron beam with a 10% energy spread from a beam with a 5 mm. diameter to a 1 mm. diameter on the target.

Furthermore, this arrangement allows the target to lie on the axis of rotation of the irradiation head. In this manner when irradiating a cylinder from within as shown in FIGS. 3 and 4 with a sheet of X-ray film surrounding the cylinder the source for irradiating in the 360° directions will be the same point on the axis of rotation of the irradiation head.

Figure 10:
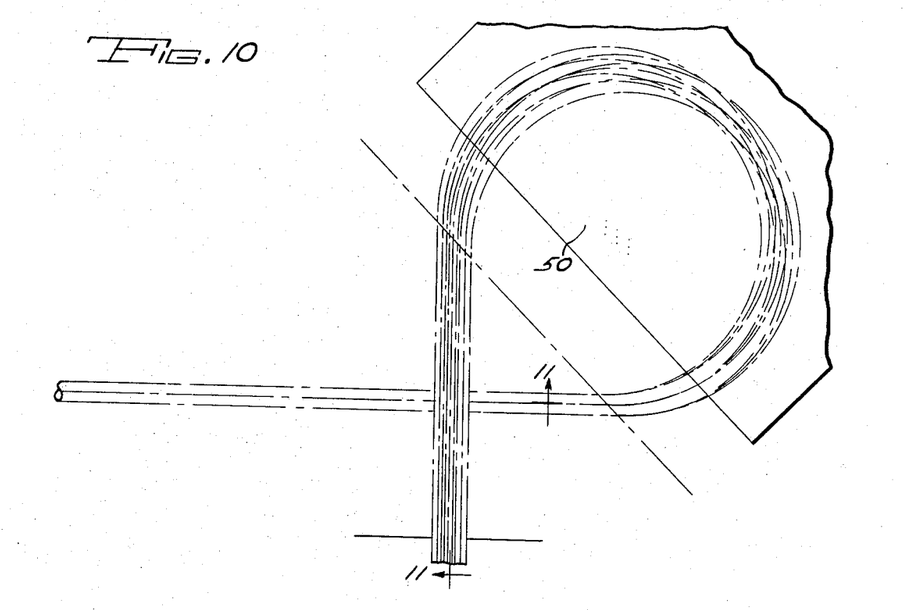
FIG. 10 is a schematic diagram showing other apparatus whereby the particle beam can be deflected so that it is directed in a direction at 90° from its original direction.
Figure 11:
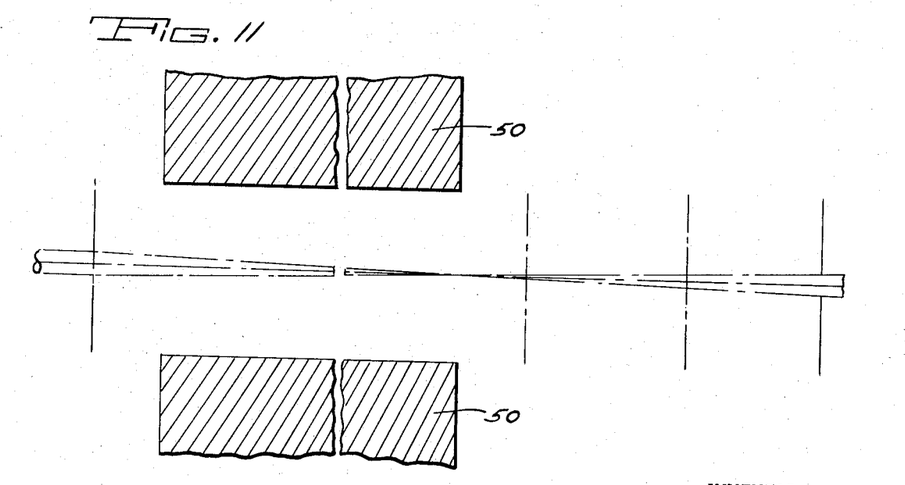
FIG. 11 is a longitudinal view taken of the particle beam shown in FIG. 10 along the line 10—10 in the direction of the arrows with the electron beam laid out in a straight line.

Referring now to FIGS. 10 and 11 there are shown vertical and horizontal sections through a particle beam which is bent through an angle of substantially 270° upon passing between the pole pieces of a bending magnet 50. The output rays from the bending magnet 50 are substantially parallel to each other on the plane of bending, and the beam is of slightly larger size than the input beam. The vertical focusing characteristics can be varied by changing the pole gap thereby changing the effective width of the fringe field.

Figure 12:
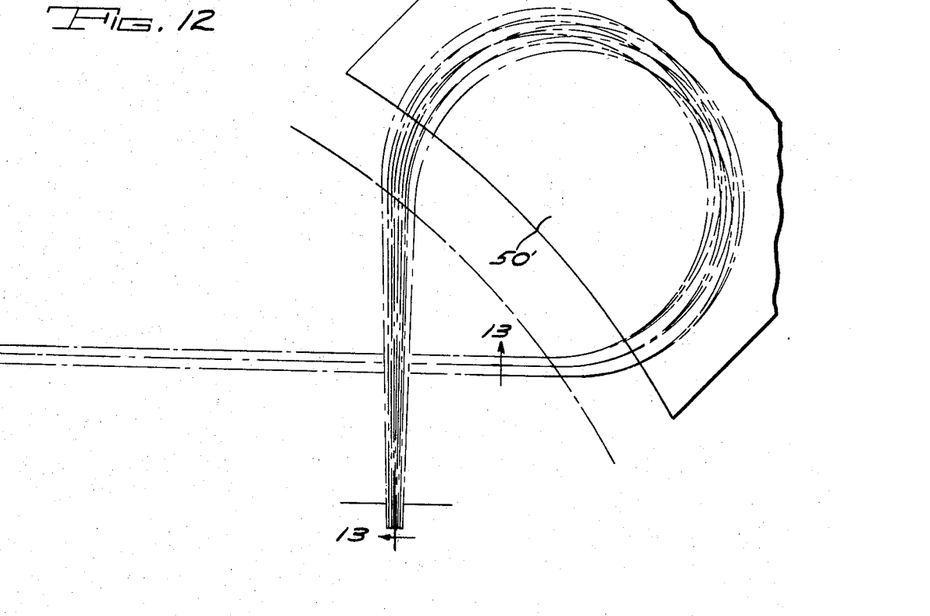
FIG. 12 is an alternative embodiment of the structure shown in FIG. 10.
Figure 13:
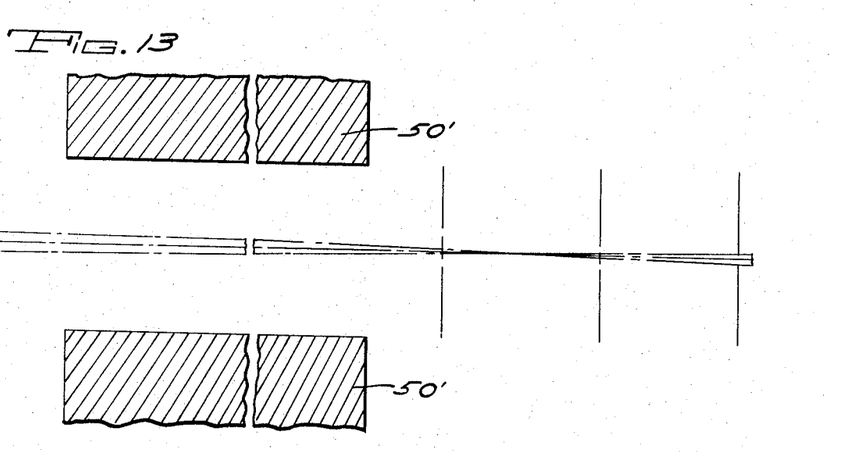
FIG. 13 is a cross-sectional view of the particle beam of FIG. 12 taken along line 13—13 in the direction of the arrows with the electron beam laid out in a straight line.

Alternatively as shown in FIGS. 12 and 13 the particle beam can be bent through an angle of substantially 270° and also provided with an energy focus at some distance from the magnet by means of a bending magnet 50' similar to the bending magnet 50 described above but with slightly concave input pole faces. This arrangement will focus the beam to a smaller spot size and the target can be located on the accelerator axis if desired.

Also, in therapy where a particle beam such as an electron beam is directed onto a target to produce X-rays for irradiating a malignancy it is extremely important when slight variations occur in beam energy that the particle beam remain perpendicular to the target, or otherwise a greater dose of irradiation would be applied to one part of the malignancy than to the other. The present invention embodies a magnet system whereby slight changes in energy of the beam emanating from the particle accelerator will not significantly change the axis of the lobe of the X-rays generated from the X-ray target.

Thus, with respect to the magnet arrangements shown in FIGS. 10–13, higher energy particle rays will remain between the bending magnets 50, 50' for a greater length of path and will therefore be bent through substantially the same angle as lower energy rays with the result that the sum of all the deflecting forces applied to any given particle will be substantially proportionate to the energy of the particle. In this manner, rays of all energies will strike the X-ray target at substantially right angles thereto and thus the axis of the lobe of X-rays will be directed perpendicular to the X-ray target and directly at the area being radiated. This avoids the possibility that a change in particle energy will cause a greater dose of irradiation in any particular area of the irradiating spot.

Figure 14:
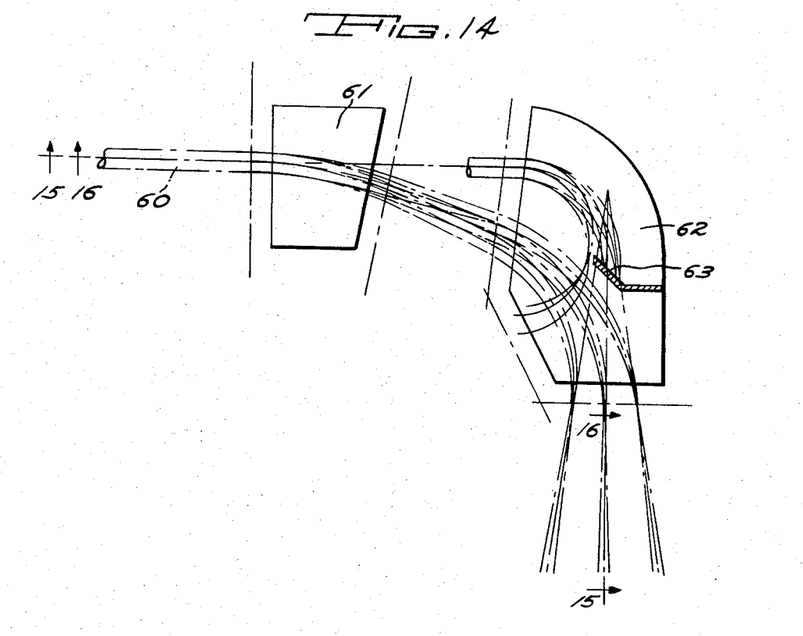
FIG. 14 is a schematic view of other means for deflecting the particle beam in the irradiation machines embodying the present invention.
Figure 15:
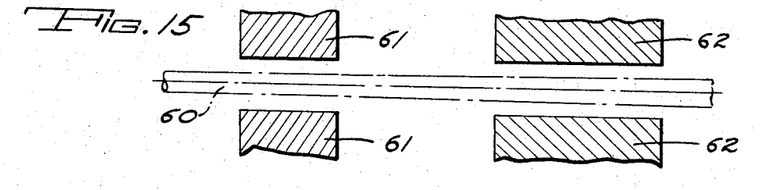
FIG. 15 is a longitudinal view of the particle beam shown in FIG. 14 taken along the line 15—15 in the direction of the arrows.
Figure 16:
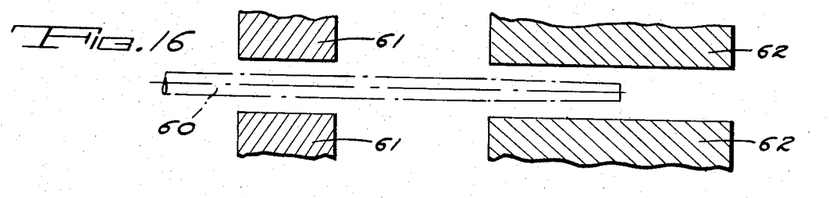
FIG. 16 is a longitudinal view of the particle and X-ray beams shown in FIG. 14 taken along line 15—15 in the direction of the arrows.

Referring now to FIGS. 14–16, there is shown another embodiment of the present invention wherein either the particle beam can be bent through an angle of 90° with respect to the axis of the accelerator and onto the object to be irradiated or can be directed upon a target to produce X-rays which are directed on the object to be irradiated.

For the direct irradiation the particle beam 60 emanating from the particle accelerator is passed between the pole pieces of a deflecting electromagnet 61 which deflects the particle beam 60 away from the axis of the particle accelerator from which it emanates. The particle beam then passes between the pole pieces of a second deflecting magnet 62. Between the pole pieces 62 of the second deflecting magnet the higher energy rays travel a further distance and are therefore subjected to a greater magnetic field so that they are deflected through substantially the same angle as lower energy rays. Upon emerging from between the pole pieces 62 of the second bending magnet the particle beam is slightly diverging for irradiation of a generally broad subject.

FIG. 15 shows a top view of the particle beam path through the magnets 61 and 62.

When it is desired to create X-rays with the apparatus of FIG. 14 the electromagnet 61 is turned off and the particle beam 60 is directed along the axis of the particle accelerator until it enters a gap between the pole pieces of the second deflecting magnet 62. With the input face of magnet 62 normal to the particle beam 60, horizontal foci are produced in a plane containing the X-ray target 63. This plane is approximately at 45° to the directions of both the input and output beam directions. The rays of lower than normal energy are bent through 90° on a shorter radius and the rays of greater than nominal energy are bent through 90° on a longer radius. Thus, central rays of all energies over the chosen energy range are traveling parallel at the instant of impingement on the target. Rays of excessively low energy miss the target and are collected in a shielded cup. This design makes the direction of the axis of the X-ray lobe always in the same direction even when the machine energy drifts; consequently, changes in electron energy do not produce asymmetries in the X-ray field.

The input face of magnet 62 can be tipped slightly if desired to produce slight vertical convergence of the beam rays at the X-ray target, thereby producing slight enlargement of the beam horizontally. FIG. 16 shows a top view of the particle beam path with the input pole pieces of the magnet 62 tipped slightly to produce this slight vertical convergence. Also with this arrangement the electron beam shown in FIG. 15 would not diverge as much upon passing through the magnet 62.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for directing ionizing radiation on a portion of an object comprising linear accelerator means for accelerating a particle beam along a substantially horizontal axis, said beam having particles with an energy spread, a target positioned on said horizontal axis for producing ionizing radiation in response to said beam impinging thereon, means for deflecting the particle beam away from the axis, means for deflecting and focusing the particles of the beam at approximately the same point on said target from a direction substantially 90° with respect to the axis for producing ionizing radiation emanating from said target on said axis in a direction substantially 90° with respect to said axis.

2. The apparatus of claim 1 including means for rotating both deflecting means about the axis of said accelerator means such that the ionizing radiation may be directed outwardly from said axis to irradiate a large portion of an object.

3. Apparatus for directing ionizing radiation on a portion of an object comprising linear accelerator means for accelerating a particle beam along a substantially horizontal axis, means for deflecting the said particle beam in a direction substantially 90° from its original direction, and means for moving the accelerator means in a manner such that the particle beam can be directed at the object being irradiated from many different directions, said apparatus being adapted for directing a particle beam with particles of different energy levels, said means for deflecting said particle beam including magnet means for deflecting all of the particles of the particle beam emanating from the accelerator means through an angle of substantially 270°, the sum of all the deflecting forces applied to any given particle being substantially proportional to the energy of that particle.

4. Apparatus for directing ionizing radiation on a portion of an object comprising linear accelerator means for accelerating a particle beam along a substantially horizontal axis, means for deflecting the said particle beam in a direction substantially 90° from its original direction, and means for moving the accelerator means in a manner such that the particle beam can be directed at the object being irradiated from many different directions, said apparatus being adapted for directing a particle beam with particles of different energy levels, said means for deflecting said particle beam including magnet means for deflecting all the particles of the particle beam emanating from the accelerator means through an angle of substantially 270° in a manner such that after being bent through 270° the particles of different energies within the beam are traveling substantially parallel to one another in a direction at 90° from the axis of the accelerator means, the sum of all the deflecting forces applied to any given particle being substantially proportional to the energy of that particle.

5. Apparatus for directing ionizing radiation on a portion of an object comprising linear accelerator means for accelerating a particle beam along a substantially horizontal axis, means for deflecting the said particle beam in a direction substantially 90° from its original direction, and means for moving the accelerator means in a manner such that the particle beam can be directed at the object being irradiated from many different directions, said deflecting means including a first magnet means for deflecting the particle beam an acute angle from the axis of the accelerator means and a second deflecting magnet means for deflecting the particle beam emanating from said first magnet means through an acute angle such that upon emerging from the second magnet the rays of the particle beam have been deflected through substantially 90°, said second magnet means having an irradiation target disposed therein, said target having a face upon which the beam impinges positioned at an angle of 45° with respect to the accelerator axis, said target being disposed outside the path of a particle beam which is deflected an acute angle by both said first and said second magnet means and said target being disposed in a position such that a particle beam entering the second magnet means along the axis of said accelerator means is deflected through substantially 90° to strike said target such that ionizing radiation is generated from the target onto the object being irradiated.

6. Apparatus for directing ionizing radiation on a portion of an object comprising linear accelerator means for accelerating a charged particle beam along a substantially horizontal axis, means for deflecting the charged particle beam away from the horizontal axis and then back across said horizontal axis from a direction substantially 90° space oriented with respect to the axis for producing ionizing radiation in a direction substantially 90° space oriented with respect to said horizontal axis, said apparatus including means for holding the object being irradiated, said holding means including an object holding member which positions the portion of the object being irradiated in the path of the ionizing radiation, a post member supporting said object holding member, said post member being mounted on a platform rotatable about a vertical axis through the portion of the object being irradiated, said post member being positioned substantially parallel to and horizontally displaced from the vertical axis of said platform.

7. Apparatus for directing ionizing radiation on a portion of an object to be irradiated comprising accelerator means for accelerating a charged particle beam along the accelerator axis, means for deflecting said charged particle beam along an exit axis in a direction which is substantially 90° space oriented with respect to the accelerator axis, said means for deflecting said charged particle beam along said exit axis which is substantially 90° space oriented with respect to said accelerator axis including means for deflecting the said charged particle beam emanating from said accelerator means through an angle of substantially 270° in a manner such that said charged particle beam is directed at an angle which is substantially 90° space oriented with respect to said accelerator axis, said linear accelerator means being rotatably mounted for rotation about an axis of rotation which is displaced from said accelerator axis and from said exit axis along which said deflected charged particle beam is directed at substantially 90° with respect to said accelerator axis.

8. Apparatus for directing ionizing radiation on a portion of an object to be irradiated comprising, linear accelerator means for accelerating a charged particle beam along the axis of said linear accelerator, deflection means coupled to said linear accelerator means for deflecting said charged particle beam away from the axis of said linear accelerator to thereby define an exit axis along which said charged particle beam travels upon emerging from said apparatus, target means for producing another type of ionizing radiation upon bombardment by said charged particle beam, said target means being disposed along said exit axis, said deflection means being further adapted and arranged to selectively direct either said charged particle beam or said another type of ionizing radiation produced by bombardment of said target means by said charged particle beam along said exit axis onto said portion of an object to be irradiated while said target means is disposed on said exit axis.

References Cited
UNITED STATES PATENTS

| | | | |
|---|---|---|---|
| 2,001,133 | 5/1935 | Hansell | 313—75 X |
| 2,292,859 | 8/1942 | Allibone | 313—55 X |
| 2,360,036 | 10/1944 | Boucher | 250—105 X |
| 2,602,751 | 7/1952 | Robinson | 250—43 X |
| 2,615,128 | 10/1952 | Ruderfer | 313—75 X |
| 2,637,818 | 5/1953 | Gund et al. | 250—49.5 |
| 2,737,593 | 3/1956 | Robinson | 313—85 X |
| 2,777,958 | 1/1957 | Le Poole | 240—41.93 |
| 2,824,969 | 2/1958 | Milling | 313—75 X |
| 2,824,987 | 2/1958 | Weissenberg et al. | 313—84.5 X |
| 2,841,717 | 7/1958 | Kizaur | 250—92 X |
| 2,890,349 | 6/1959 | Huszar | 250—61.5 |
| 2,913,619 | 11/1959 | Geisler | 250—52 |
| 2,950,388 | 8/1960 | White | 250—41.9 |

OTHER REFERENCES

"An 8-m.e.v Linear Accelerator for X-ray Therapy" by C. W. Miller from "The Metropolitan Vickers Gazette," vol. 25, No. 424, November 1954, pp. 433–447.

(Other references on following page)

"Experimental Evaluation of the Physical Characteristics of a 45-m.e.v. Medical Linear Electron Accelerator" by C. L. Hsieh et al. from "Radiology," vol. 67, No. 2, August 1959, p. 253–272.

"Industrial Radiography and the Linear Accelerator" by C. W. Miller from the "Journal of the British Institution of Radio Engineers," vol. 14, No. 8, August 1954, pp. 361–375.

"Linear Electron Accelerators for Deep X-Ray Therapy" by T. R. Chippendale from "Philips Technical Review," vol. 17, No. 1, July 1955, pp. 31–33.

"8-m.e.v. Linear Accelerator for X-Ray Therapy" from "The Engineer," vol. 196, No. 5101, October 30, 1953, pp. 554–556.

"The Medical Research Council Linear Accelerator and Cyclotron" by C. A. P. Wood et al. from "Nature," vol. 173, No. 4397, Feb. 6, 1954, pp. 233–235.

"Experimental Evaluation of the Physical Characteristics of a 45-m.e.v. Medical Linear Electron Accelerator" by C. L. Hsieh et al. from "Radiology," vol. 67, No. 2, August 1956, pp. 263–272.

WILLIAM F. LINDQUIST, *Primary Examiner.*

JAMES W. LAWRENCE, RALPH G. NILSON,
*Examiners.*